(12) United States Patent
Cox

(10) Patent No.: US 11,447,241 B2
(45) Date of Patent: Sep. 20, 2022

(54) SCISSORLESS SWASHPLATE UNIBALL

(71) Applicant: LOCKHEED MARTIN CORPORATION, Bethesda, MD (US)

(72) Inventor: John C. Cox, Jupiter, FL (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 73 days.

(21) Appl. No.: 16/928,626

(22) Filed: Jul. 14, 2020

(65) Prior Publication Data
US 2022/0017217 A1    Jan. 20, 2022

(51) Int. Cl.
*B64C 27/605* (2006.01)
*F01D 5/02* (2006.01)

(52) U.S. Cl.
CPC .............. *B64C 27/605* (2013.01); *F01D 5/02* (2013.01); *F05D 2220/90* (2013.01); *F05D 2240/50* (2013.01); *F05D 2240/60* (2013.01)

(58) Field of Classification Search
CPC .......................... B64C 27/605; F05D 2240/50
See application file for complete search history.

(56) References Cited

U.S. PATENT DOCUMENTS

| | | | |
|---|---|---|---|
| 4,650,400 A * | 3/1987 | David | B64C 27/72 416/114 |
| 6,033,182 A * | 3/2000 | Rampal | B64C 27/605 244/17.25 |
| 6,074,168 A * | 6/2000 | Rampal | B64C 27/605 416/114 |
| 6,149,386 A | 11/2000 | Rampal | |
| 7,037,072 B2 | 5/2006 | Carson | |
| 8,142,158 B2 * | 3/2012 | Schmaling | B64C 27/605 416/149 |
| 2019/0203765 A1 | 7/2019 | Baskin et al. | |

* cited by examiner

*Primary Examiner* — Michael L Sehn
(74) *Attorney, Agent, or Firm* — Foley & Lardner LLP

(57) ABSTRACT

A swashplate assembly of a rotary wing aircraft includes a first component, a second component arranged concentrically with the first component, and a bearing disposed between the first component and the second component. The bearing includes a spherical bearing and at least one bearing roller element and is operable to transmit torque between the first component and the second component.

18 Claims, 6 Drawing Sheets

SCISSORLESS SWASHPLATE UNIBALL

STATEMENT OF FEDERAL SUPPORT

This invention was made with government support under W911W6-19-9-0005 awarded by the United States Army. The government has certain rights in the invention.

BACKGROUND

Exemplary embodiments of the present disclosure relate to a rotary wing aircraft, and more particularly, to a swashplate for controlling a rotor assembly of a rotary wing aircraft.

Control of a rotary wing aircraft is affected by varying the pitch of the rotor blades individually as the rotor rotates and by varying the pitch of all of the blades together. These are known respectively as cyclic and collective pitch control. Blade pitch control of a rotary wing aircraft is typically achieved through a swashplate assembly which transfers the motion of non-rotating servo-driven control members within to the rotating members.

The swashplate assembly is typically concentrically mounted about a rotor shaft. The swashplate assembly includes two rings connected by a series of bearings with one ring connected to the airframe (stationary), and the other ring connected to the rotor hub (rotating). The rotating ring is connected to the rotor hub through a pivoted link device typically referred to as "scissors", with the static ring similarly connected to the airframe. The rotating swash plate rotates relative the stationary swash plate. Apart from rotary motion, the stationary and rotating swash plate otherwise move as a unitary component. Collective control is achieved by translating the swash plate assembly up and down with respect to the rotor shaft and cyclic control is achieved by tilting the swash plate relative to the rotor shaft.

The stationary ring is typically mounted about the rotor shaft through a spherical ball joint that allows for tilt of the swash plate assembly, with the rotor shaft allowing translation of the swash plate assembly along the axis. The spherical ball joint requires a running surface to allow for translation along the axis.

BRIEF DESCRIPTION

According to an embodiment, a swashplate assembly of a rotary wing aircraft includes a first component, a second component arranged concentrically with the first component, and a bearing disposed between the first component and the second component. The bearing includes a spherical bearing and at least one bearing roller element and is operable to transmit torque between the first component and the second component.

In addition to one or more of the features described above, or as an alternative, in further embodiments the first component is a swashplate guide, and the second component is a swashplate.

In addition to one or more of the features described above, or as an alternative, in further embodiments the swashplate is a rotating swashplate.

In addition to one or more of the features described above, or as an alternative, in further embodiments the swashplate is a stationary swashplate.

In addition to one or more of the features described above, or as an alternative, in further embodiments at least one first groove is formed in an outer surface of the first component and at least one second groove is formed in an inner surface of the second component, the at least one bearing roller element being arranged within the at least one first groove and the at least one second groove.

In addition to one or more of the features described above, or as an alternative, in further embodiments the at least one first groove includes a plurality of first grooves spaced about a circumference of the first component, and the at least one second groove includes a plurality of second grooves spaced about the inner surface of the second component.

In addition to one or more of the features described above, or as an alternative, in further embodiments each of the plurality of first grooves is radially aligned with a respective second groove of the plurality of second grooves.

In addition to one or more of the features described above, or as an alternative, in further embodiments the second component and the bearing are axially translatable relative to the first component to provide collective control.

In addition to one or more of the features described above, or as an alternative, in further embodiments the at least one bearing roller element is a spherical ball.

According to another embodiment, a rotor system includes a rotor shaft defining an axis of rotation, at least one rotor blade operably coupled to the rotor shaft that is rotatable about the axis of rotation and a swashplate assembly. The swashplate assembly includes a swashplate guide mounted about the rotor shaft, a rotationally stationary swashplate pivotally mounted about a central pivot point defined along the axis of rotation, a rotational swashplate which defines a rotor pitch control point along a plane which passes through said central pivot point, and a bearing including a spherical bearing and at least one bearing roller element. The bearing is operable to transmit torque between the swashplate guide and one of the stationary swashplate and the rotational swashplate.

In addition to one or more of the features described above, or as an alternative, in further embodiments at least one first groove is formed in an outer surface of the swashplate guide and at least one second groove is formed in an inner surface of the one of the stationary swashplate and the rotational swashplate, the at least one bearing roller element being arranged within the at least one first groove and the at least one second groove.

In addition to one or more of the features described above, or as an alternative, in further embodiments the at least one first groove includes a plurality of first grooves spaced about a circumference of the swashplate guide, and the at least one second groove includes a plurality of second grooves spaced about the inner surface of the one of the stationary swashplate and the rotational swashplate.

In addition to one or more of the features described above, or as an alternative, in further embodiments each of the plurality of first grooves is radially aligned with a respective second groove of the plurality of second grooves.

In addition to one or more of the features described above, or as an alternative, in further embodiments the second component and the bearing are axially translatable relative to the swashplate guide to provide collective control.

In addition to one or more of the features described above, or as an alternative, in further embodiments the at least one bearing roller element is a spherical ball.

In addition to one or more of the features described above, or as an alternative, in further embodiments the swashplate assembly further comprising a single scissor assembly.

In addition to one or more of the features described above, or as an alternative, in further embodiments when the bearing is disposed between the swashplate guide and the stationary swashplate, the single scissor assembly is a rotational scissor assembly.

In addition to one or more of the features described above, or as an alternative, in further embodiments when the bearing is disposed between the swashplate guide and the rotational swashplate, the single scissor assembly is a stationary scissor assembly.

In addition to one or more of the features described above, or as an alternative, in further embodiments the rotor system is a portion of an aircraft.

BRIEF DESCRIPTION OF THE DRAWINGS

A detailed description of one or more embodiments of the disclosed apparatus and method are presented herein by way of exemplification and not limitation with reference to the Figures.

DETAILED DESCRIPTION

Figure 1:
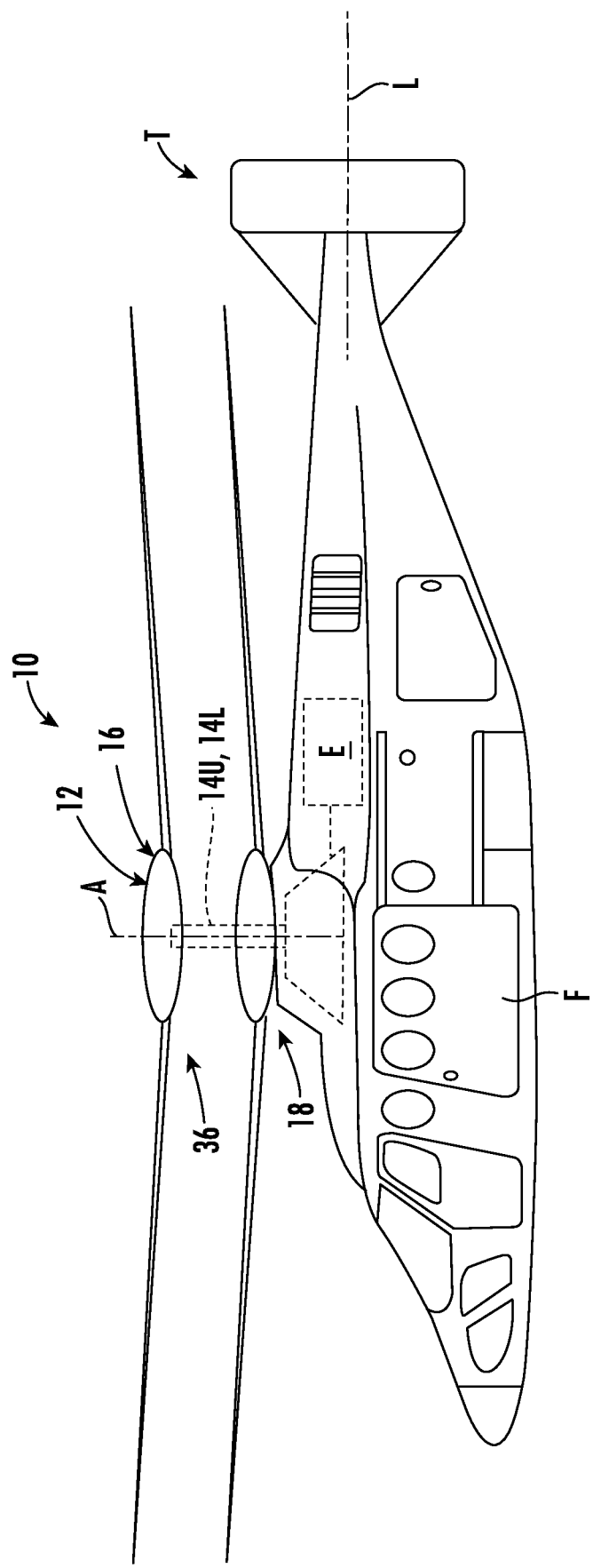
FIG. 1 is side view of an example of a rotary wing aircraft.

FIG. 1 illustrates an exemplary vertical takeoff and landing (VTOL) rotary wing aircraft 10 having a dual, counter-rotating main rotor system 12, which rotates about a rotating upper main rotor shaft 14U, and a counter-rotating lower main rotor shaft 14L (FIGS. 1 and 2), both about an axis of rotation A. The aircraft 10 includes an airframe F which supports the dual, counter-rotating, coaxial main rotor system 12 as well as an optional translational thrust system T which provides translational thrust during high speed forward flight, generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircrafts will also benefit from the present disclosure.

A main gearbox G (FIG. 2) located above the aircraft cabin drives the rotor system 12. The translational thrust system T may be driven by the same main gearbox G which drives the rotor system 12. The main gearbox G is driven by one or more engines (illustrated schematically at E in FIG. 2). As shown, the main gearbox G may be interposed between the gas turbine engines E, the rotor system 12, and the translational thrust system T.

Figure 2:
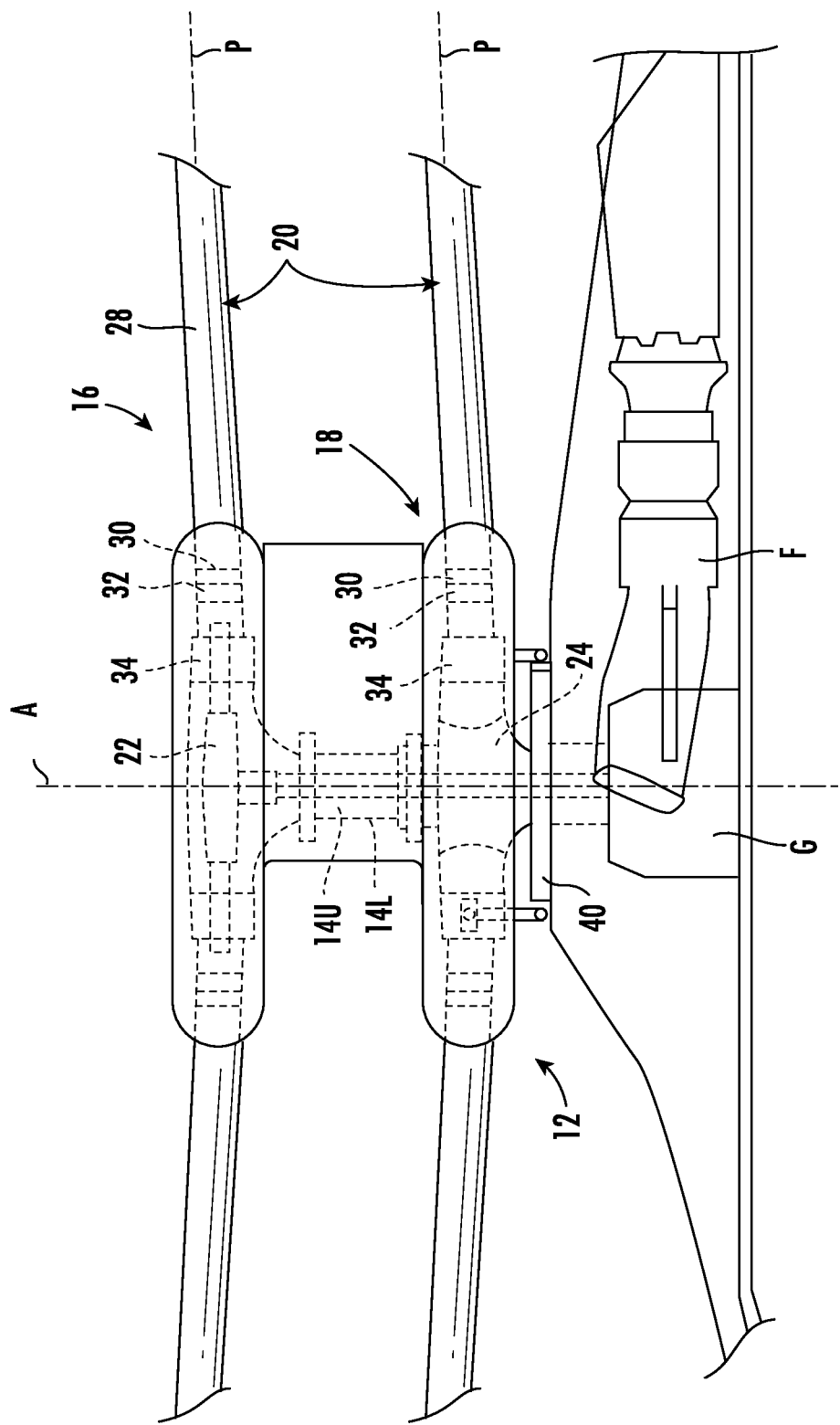
FIG. 2 is a detailed partial phantom view of the dual, counter-rotating, coaxial rotor system of the aircraft of FIG. 1.

Referring now to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L, which rotates with the lower hub assembly 24.

The plurality of main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32, which supports the rotor blade spindle 30 within a bearing housing 34 to permit the rotor blade 28 to pitch about a pitching axis P. It should be understood that various blade attachments may be utilized with the present disclosure.

Figure 3:
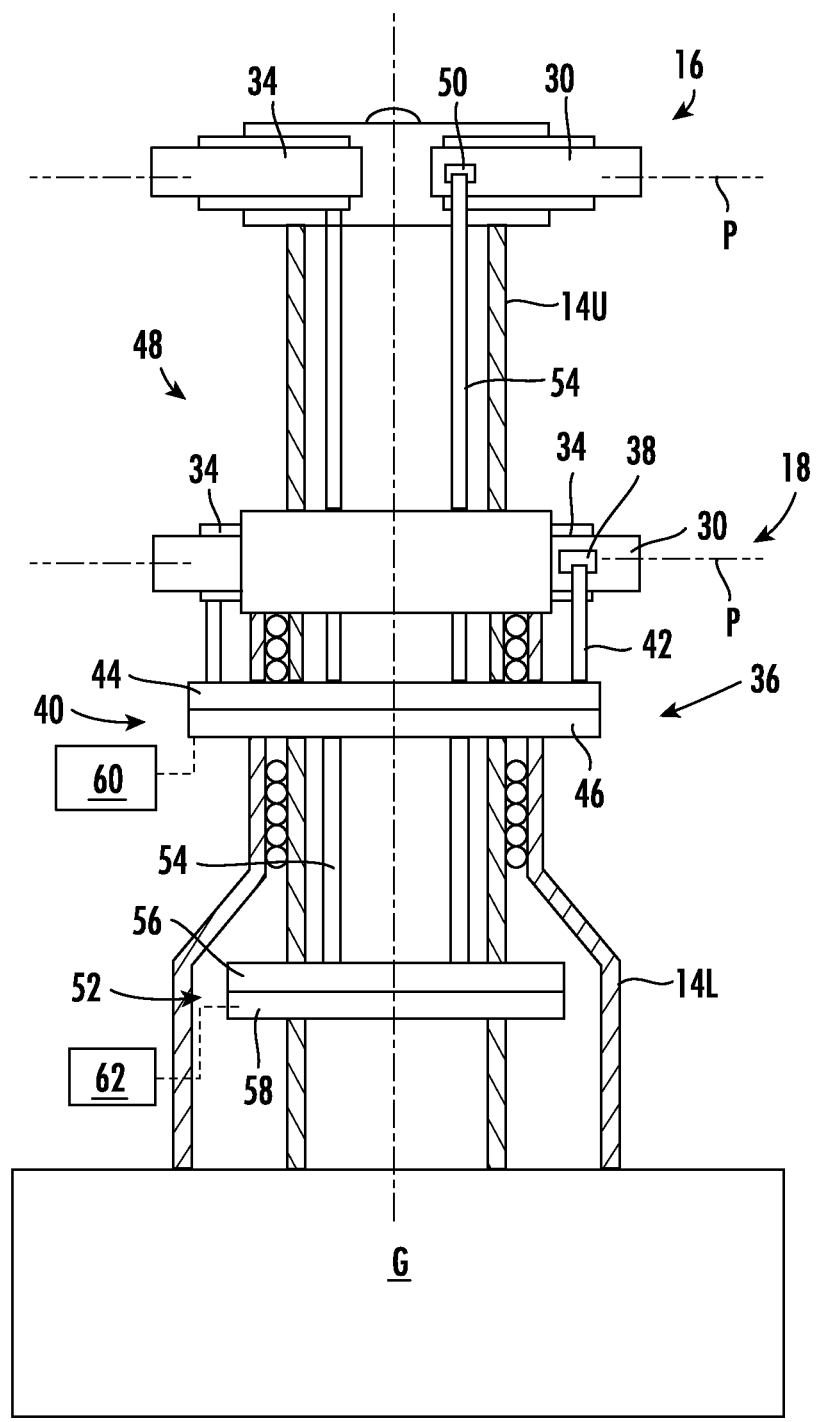
FIG. 3 is a schematic view of an example of an upper and lower rotor control system according to an embodiment.

Referring to FIG. 3, a lower rotor control system 36 may include a rotor blade pitch control horn 38 mounted for rotation with the rotor blade spindle 30 of each lower rotor blade 28. Each lower rotor blade pitch control horn 38 is linked to a lower rotor swashplate assembly 40 through pitch control rods 42. The lower rotor swashplate assembly 40 has two portions, a rotating swashplate 44 and a stationary swashplate 46. The rotating swashplate 44 is configured to rotate with the pitch control rods 42 while the stationary swashplate 46 is linked to a lower rotor servo mechanism 60 to impart the desired pitch control thereto. Similarly, an upper rotor control system 48 includes rotor blade pitch control horn 50 mounted for rotation with the rotor blade spindle 30 of each upper rotor blade 28. The upper rotor blade pitch control horn 50 is linked to an upper rotor swashplate assembly 52 through a pitch control rod 54. A rotating swashplate 56 of the upper rotor swashplate assembly 52 is configured to rotate with the upper rotor pitch control rods 54 while a stationary swashplate 58 of the upper rotor swashplate assembly 52 is non-rotating and is linked to upper rotor servo mechanism 62 to impart the desired pitch control thereto.

In such embodiments, each rotor control system 36, 48 is independently controlled through the separate swashplate assemblies 40, 52 which selectively articulate each rotor system 16, 18. Generally, motion of the swashplate assemblies 40, 52 along the rotor axis A will cause the rotor blades 28 of the respective rotor system 16, 18 to vary pitch collectively and tilting of the swashplate assemblies 40, 52 with respect to the axis A will cause the rotor blades 28 to vary pitch cyclically. The swashplate assemblies 40, 52 translate and/or tilt by separate servo mechanisms 60, 62. The pitch control rods 42, 54 are in the rotor rotating reference system of the respective rotor while the servo mechanisms 60, 62 are in the non-rotating reference system which selectively articulates each rotor system 16, 18 independently in both cyclic and collective in response to a rotor control system 36, 44. The rotor control systems 36, 44 preferably communicate with a flight control system which receives pilot inputs from controls such as a collective stick, cyclic stick, foot pedals and the like.

It should be understood that the pitch control rods 42, 54 and servo mechanisms 60, 62 for the upper rotor system 16 and similarly for the lower rotor system 18 may be located internally or externally to the respective main rotor shaft 14U, 14L and that various pitch control rods, links and servo mechanisms at various locations for cyclic and collective pitch control of the rotor system 12 are contemplated herein.

Figure 4:
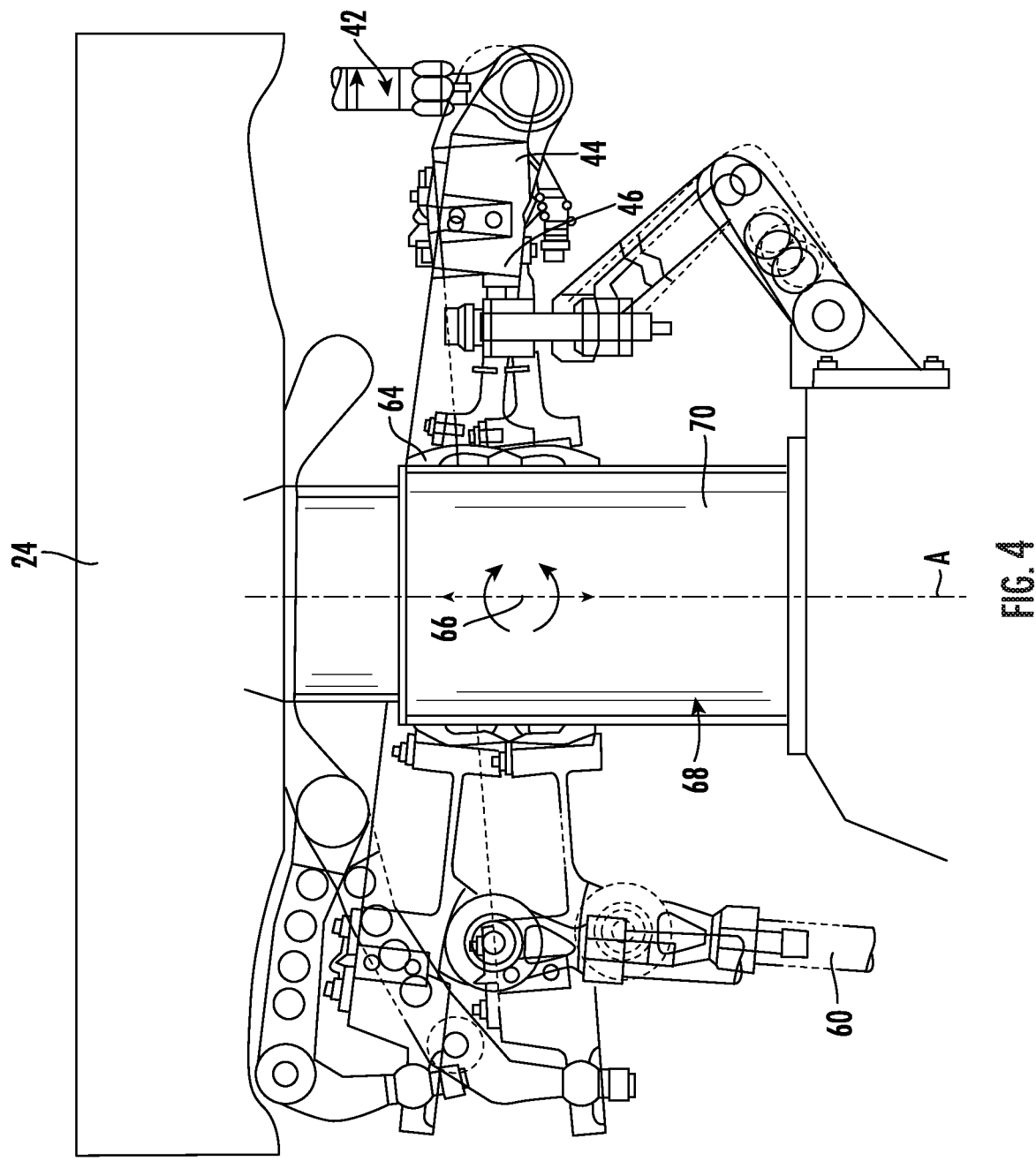
FIG. 4 schematic sectional view of a swashplate assembly of the lower rotor system according to an embodiment.

With reference now to FIG. 4, pitch control commands imparted through the servo mechanisms 60, 62 and pitch control rods 42, 54 cause tilting of one of the swashplate assemblies 40, 52 about a bearing 64, such as a spherical bearing or uniball for example (FIG. 4), which defines a central pivot point 66 located along the axis of rotation A. As shown, the rotationally stationary swashplate, such as stationary swashplate 46 for example, may be mounted to a cylindrical swashplate guide 68 through the uniball 64 to permit tilting of the swashplate 46 about the virtual pivot point 66 and translation thereof along the axis of rotation A. The cylindrical swashplate guide 68 is mounted concentrically about, but not in contact with the rotor shaft 14L. Tilting of the swashplate assembly 40 about the central pivot point 66 imparts pitch change loads to each rotor blade through the pitch control rods 42 which are mounted to the rotational swashplate 44. Articulation of the swashplate assembly 40 drives the pitch control rods 42 which cause the rotor blade to pitch about the pitch change axis P.

Inputs from the servo mechanisms 60 cause the swashplate assembly 40 to axially translate along the axis of rotation A to impart pitch control loads to the blades. When the swashplate assembly 40 translates along axis A, it imparts collective pitch change to the blade assemblies and when it tilts about the virtual pivot point 66, it imparts cyclic pitch change.

It should be understood that the swashplate configuration illustrated and described herein is intended as an example only. Other embodiments, such as where the uniball 64 is mounted to the rotating swashplate 44 for example, are also contemplated herein. While described in terms of a swashplate guide 68 surrounding a rotor shaft, it is understood that in other embodiments, the swashplate guide 68 could be a shaft or mast of one of the upper or lower rotor systems 16, 18.

Figure 5:
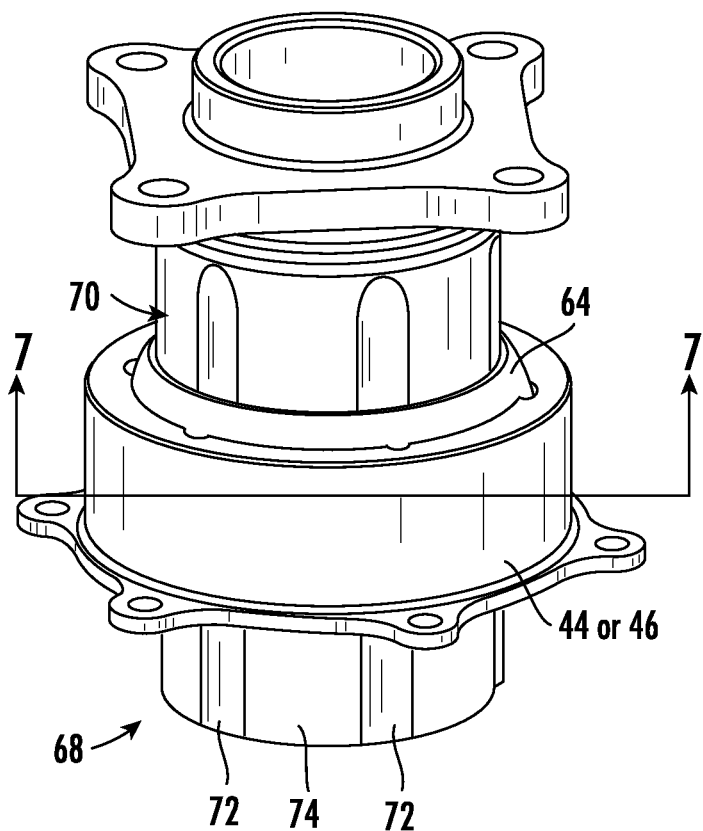
FIG. 5 is a perspective view of an interface of the swashplate assembly according to an embodiment.
Figure 6:
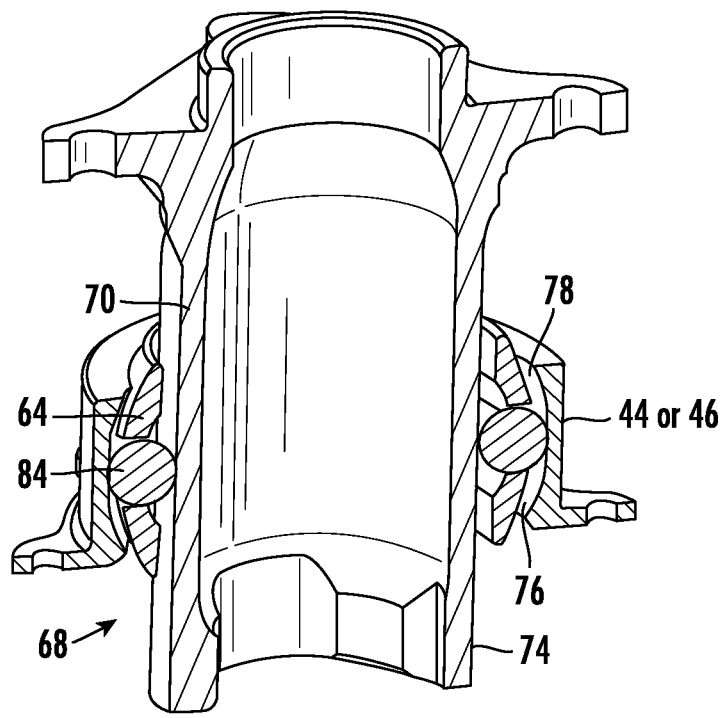
FIG. 6 is a cross-sectional view of the interface of the swashplate assembly of FIG. 5 taken in a vertical plane containing the rotor axis of rotation according to an embodiment.
Figure 7:
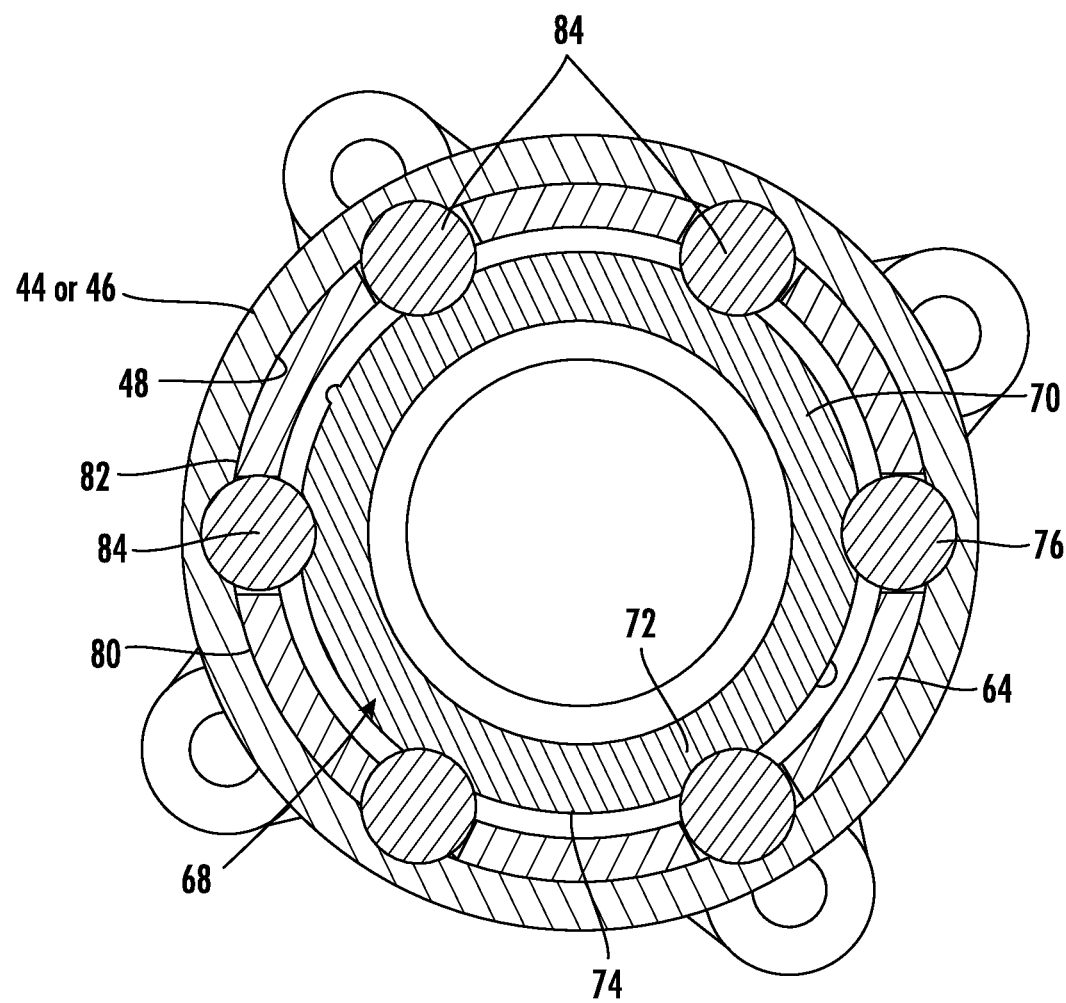
FIG. 7 is a cross-sectional view of the interface of the swashplate assembly of FIG. 5 taken along line 7-7 according to an embodiment.

Referring now to FIGS. 5-7, an example of an interface between a swashplate guide 68, a uniball 64, and a corresponding swashplate, either the rotating swashplate 44 or the stationary swashplate 46 of a swashplate assembly, such as swashplate assembly 40 is illustrated in more detail. As shown, the swashplate guide 68 includes a substantially hollow tube 70. Although the tube 70 is illustrated as being generally cylindrical in shape, it should be understood that any suitable shape is within the scope of the disclosure. Further, the swashplate guide 68 may be formed from any material, including but not limited to a metal or composite including fiberglass or graphite for example.

The interface illustrated and described herein is intended to restrict or limit relative rotation between a first component, such as the swashplate 44/46 for example, the uniball 64, and a second component, such as the swashplate guide 68 for example. In an embodiment, best shown in FIG. 5, at least one first groove 72 is formed in an outer surface 74 of the cylindrical tube 70. The one or more first grooves 72 may extend generally vertically, parallel to the axis of rotation A of the rotor shaft 14L and in embodiments including a plurality of first grooves 72, may be equidistantly spaced about the circumference of the swashplate guide 68. In the illustrated, non-limiting embodiment, each of the plurality of first grooves 72 is substantially identical to one another, and the configuration of each first groove 72 is generally constant over its height oriented parallel to the rotational axis A. However, embodiments where the configuration of each first groove 72 varies over its height, embodiments where the configurations of adjacent first grooves 72 vary, or embodiments where the spacing between first grooves 72 varies are also contemplated herein.

At least one second groove 76 may be formed in an inner surface 78 of the swashplate 44 or 46 closest to the swashplate guide 68. In an embodiment, the total number of second grooves 76 is substantially identical to the total number of first grooves 72. Further, each of the second grooves 76 may be positioned about the periphery of the inner surface 78 of the swashplate 44 or 46 in alignment with one of the corresponding first grooves 72. Similar to the first grooves 72, in a non-limiting embodiment, each of the plurality of second grooves 76 is substantially identical, and the configuration of each second groove 76 is generally constant over its height extending between an upper end and lower end of the inner surface 78 of the swashplate 44 or 46. In an embodiment, the contour of each of second groove 76 is complementary to the curvature of the inner surface 78 of the swashplate 44 or 46 and the exterior surface 80 of the uniball 64. However, embodiments where the configuration of each second groove 76 varies over its height, embodiments where the configurations of adjacent second grooves 76 vary, or embodiments where the spacing between second grooves 76 varies are also within the scope of the disclosure.

In an embodiment, a plurality of through holes 82 are formed in the body of the uniball 64 and a bearing roller element 84 is disposed within each of the through holes 82. In an embodiment, as shown, the bearing roller elements 84 are spherical or ball-like in shape. However, a bearing roller element 84 having another configuration, such as cylindrical tapered, barrel, or needle roller elements for example are also contemplated herein. Each of the bearing roller elements 84 is aligned with one of the first grooves 72 and one of the second grooves 76, respectively. As a result, the swashplate guide 68 functions in a manner similar to an inner race and the swashplate 44 or 46 functions in a manner similar to an outer race, and the uniball 64 including the bearing roller elements 84 functions as the movable element disposed between the inner and outer races of a bearing assembly.

Because movement of the bearing roller elements 84 is restricted to within the first and second grooves 72, 76, respectively, the swashplate 44 or 46 and the uniball 64 are prevented from rotating relative to the swashplate guide 68. Specifically, any shear applied to the bearing roller elements 84 is shared between the swashplate guide 68 and the swashplate 44 or 46. As a result, a torque applied either the swashplate guide 68 or the swashplate 44 or 46 is transmitted to the other of the swashplate guide 68 and the swashplate 44 or 46 via the bearing roller elements 84. Additionally, the swashplate 44 or 46 is configured to drive the uniball 64 in collective motion relative to the swashplate guide 68, which in turn causes the bearing roller elements 84 to move in collective motion, free from binding. When the swashplate 44 or 46 is tilted to impart cyclic control input, the bearing roller elements 84 rotate on an inclined plane relative to the center axis of the swashplate guide 68. This enables the mechanism to transmit torque in either a level or inclined attitude during swashplate motion.

The interface between the stationary and rotating frames of a swashplate assembly 40, 52 as described herein includes a constant velocity joint operable to transmit torque to react swashplate bearing drag. As a result, one of the stationary scissor assemblies (not shown) and the rotating scissor assemblies (not shown) used in a conventional swashplate assembly 40, 52 may be eliminated based on which swashplate 44 or 46 is functioning as the inner member of the swashplate guide 68. The interface therefore has a reduced weight and complexity than existing swashplate assemblies.

While the present disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A swashplate assembly of a rotary wing aircraft comprising:
   a first component;
   a second component arranged concentrically with the first component and;
   a bearing disposed between the first component and the second component and including a spherical bearing and at least one bearing roller element, wherein the bearing is operable to transmit torque between the first component and the second component;
   wherein at least one first groove is formed in an outer surface of the first component and at least one second groove is formed in an inner surface of the second component, the at least one bearing roller element being arranged within the at least one first groove and the at least one second groove.

2. The swashplate assembly of claim 1, wherein the first component is a swashplate guide, and the second component is a swashplate.

3. The swashplate assembly of claim 2, wherein the swashplate is a rotating swashplate.

4. The swashplate assembly of claim 2, wherein the swashplate is a stationary swashplate.

5. The swashplate assembly of claim 1, wherein the at least one first groove includes a plurality of first grooves spaced about a circumference of the first component, and the at least one second groove includes a plurality of second grooves spaced about the inner surface of the second component.

6. The swashplate assembly of claim 5, wherein each of the plurality of first grooves is radially aligned with a respective second groove of the plurality of second grooves.

7. The swashplate assembly of claim 1, wherein the second component and the bearing are axially translatable relative to the first component to provide collective control.

8. The swashplate assembly of claim 1, wherein the at least one bearing roller element is a spherical ball.

9. A rotor system comprising:
   a rotor shaft defining an axis of rotation;
   at least one rotor blade operably coupled to the rotor shaft, the at least one rotor blade being rotatable about the axis of rotation; and
   a swashplate assembly including:
   a swashplate guide mounted about the rotor shaft;
   a rotationally stationary swashplate pivotally mounted about a central pivot point defined along the axis of rotation;
   a rotational swashplate which defines a rotor pitch control point, said rotor pitch control point defined along a plane which passes through said central pivot point; and
   a bearing including a spherical bearing and at least one bearing roller element, wherein the bearing transmits torque between the swashplate guide and one of the stationary swashplate and the rotational swashplate;
   wherein at least one first groove is formed in an outer surface of the swashplate guide and at least one second groove is formed in an inner surface of the one of the stationary swashplate and the rotational swashplate, the at least one bearing roller element being arranged within the at least one first groove and the at least one second groove.

10. The rotor system of claim 9, wherein the at least one first groove includes a plurality of first grooves spaced about a circumference of the swashplate guide, and the at least one second groove includes a plurality of second grooves spaced about the inner surface of the one of the stationary swashplate and the rotational swashplate.

11. The rotor system of claim 10, wherein each of the plurality of first grooves is radially aligned with a respective second groove of the plurality of second grooves.

12. The swashplate assembly of claim 10, wherein each of the plurality of first grooves are equidistantly spaced about the circumference of the swashplate guide and extend vertically in a direction parallel to an axis of rotation of the rotor shaft.

13. The rotor system of claim 9, wherein the second component and the bearing are axially translatable relative to the swashplate guide to provide collective control.

14. The rotor system of claim 9, wherein the at least one bearing roller element is a spherical ball.

15. The rotor system of claim 9, the swashplate assembly further comprising a single scissor assembly.

16. The rotor system of claim 15, wherein when the bearing is disposed between the swashplate guide and the stationary swashplate, the single scissor assembly is a rotational scissor assembly.

17. The rotor system of claim 15, wherein when the bearing is disposed between the swashplate guide and the rotational swashplate, the single scissor assembly is a stationary scissor assembly.

18. The rotor system of claim 9, wherein the rotor system is a portion of an aircraft.

* * * * *